(12) United States Patent
Ichimura et al.

(10) Patent No.: US 6,987,725 B2
(45) Date of Patent: *Jan. 17, 2006

(54) OPTICAL RECORDING MEDIUM WITH HIGH DENSITY TRACK PITCH AND OPTICAL DISK DRIVE FOR RECORDING AND PLAYBACK OF THE SAME

(75) Inventors: Isao Ichimura, Tokyo (JP); Kiyoshi Osato, Chiba (JP); Jun Nakano, Tokyo (JP); Shin Masuhara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/081,555

(22) Filed: Mar. 17, 2005

(65) Prior Publication Data

US 2005/0163033 A1 Jul. 28, 2005

Related U.S. Application Data

(63) Continuation of application No. 10/181,776, filed as application No. PCT/JP01/10124 on Nov. 20, 2001, now Pat. No. 6,882,616.

(30) Foreign Application Priority Data

Nov. 20, 2000 (JP) ............................ 2000-353288
Jan. 18, 2001 (JP) ............................ 2001-010716

(51) Int. Cl.
*G11G 7/24* (2006.01)

(52) U.S. Cl. .................. 369/275.4; 369/112.24

(58) Field of Classification Search ............... 369/100, 369/275.4, 112.24, 53.29, 111, 44.13, 53.24, 369/121, 112.17, 112.23

See application file for complete search history.

(56) References Cited

U.S. PATENT DOCUMENTS 5,537,373 A 7/1996 Horikiri .................... 369/44.13

(Continued)

FOREIGN PATENT DOCUMENTS

JP 5-120733 5/1993

(Continued)

*Primary Examiner*—W. R. Young
*Assistant Examiner*—Lixi Chow
(74) *Attorney, Agent, or Firm*—Oblon, Spivak, McClelland, Maier & Neustadt, P.C.

(57) ABSTRACT

The present invention provides an optical recording medium and an optical disk device realizing prevention of crosswrite and uniformity of playback signals and capable of easily securing compatibility with a read only disk. It provides an optical recording medium on which light LB condensed by a lens (12, 14) having a numerical aperture of 0.85±0.1 and a wavelength of 405±5 nm is focused for recording or playback, having a substrate 1 formed with a groove 2 in its surface, an optical recording layer 3 formed on the substrate and having topography corresponding to the groove, and a light transmission type protection layer 4 formed on the optical recording layer; used when light for recording or playback is focused from the protection layer side to the optical recording layer; using as a recording area only the optical recording layer of one of a side far from the emitting side of the light for recording or playback, that is, a portion corresponding to a recessed portion of the topography, and a side close to it, that is, a portion corresponding to a projecting portion; having a track pitch of 0.32±0.01 μm; and having a depth D2 of a recessed portion with respect to a projecting portion in the range of 19 to 24 nm.

1 Claim, 16 Drawing Sheets

U.S. PATENT DOCUMENTS

| | | | |
|---|---|---|---|
| 5,742,578 A | 4/1998 | Kumai et al. | 369/124.11 |
| 5,844,883 A | 12/1998 | Kanno et al. | 369/53.29 |
| 5,933,411 A | 8/1999 | Inui et al. | 369/275.4 |
| 6,122,233 A | 9/2000 | Iketani et al. | 369/44.26 |
| 6,242,066 B1 * | 6/2001 | Yamasaki et al. | 428/64.1 |

FOREIGN PATENT DOCUMENTS

| | | |
|---|---|---|
| JP | 2000-298878 | 10/2000 |

* cited by examiner

OPTICAL RECORDING MEDIUM WITH HIGH DENSITY TRACK PITCH AND OPTICAL DISK DRIVE FOR RECORDING AND PLAYBACK OF THE SAME

CROSS REFERENCE TO RELATED APPLICATION

This application is a continuation of application Ser. No. 10/181,776, filed Aug. 16, 2002, now U.S. Pat. No. 6,882,616 the entire contents of which being incorporated herein by reference.

TECHNICAL FIELD

The present invention relates to an optical recording medium (hereinafter also referred to as an "optical disk") and an optical disk device for playing back or recording on this, more particularly relates to an optical recording medium capable of high density recording and an optical disk device for playing back or recording on this.

BACKGROUND ART

In recent years, along with the development of technology for digitally recording moving pictures, still pictures, and other video data, large volumes of data are now being handled. CD or DVD and other optical disk devices are now in the limelight as large volume recording devices. Research for further increasing capacity is also underway.

FIG. 1 is a schematic view of a sectional structure of an optical disk of the CD-RW (rewritable) type and a method of emission of light.

Grooves 6 are provided in one surface of a light transmission type disk substrate 5 having a thickness D5 of about 1.2 mm. An optical recording layer 7 comprised of for example a dielectric film, a recording film, another dielectric film, a reflection film, etc. stacked in that order is formed on this surface. The film configuration and the number of layers are different according to the type and design of the recording material.

A protection layer 8 is formed above the optical recording layer 7.

An optical disk device for recording on or playing back a CD-RW type or other optical disk, in the normal configuration, has a light source for emitting light having a wavelength $\lambda$ for recording or playback, an optical system including an object lens (condenser lens) having a numerical aperture NA for condensing the light emitted by the light source onto the optical recording layer of the optical recording medium, and a light receiving element for detecting light reflected from the optical recording layer, etc.

In for example the CD-RW system, as shown in FIG. 1, a laser beam LB for playback or recording is condensed by for example an object lens 50, passes through the light transmission type disk substrate 5, and is focused on the optical recording layer 7 of the optical disk having the above structure.

At the time of playback of the optical disk, return light reflected at the optical recording layer is received at the light receiving element, a predetermined signal is generated by a signal processing circuit, and a playback signal is taken out.

At the playback or recording of the optical disk, a spot size $\phi$ of the light on the optical recording layer is generally given by the following equation (1):

$$\phi = \lambda/NA \tag{1}$$

The spot size $\phi$ of the light directly affects the recording density of the optical recording medium. The smaller the spot size $\phi$, the higher density of recording possible and the larger capacity possible. Namely, this means that the shorter the wavelength $\lambda$ of the light or the larger the numerical aperture NA of the object lens, the smaller the spot size $\phi$ and the higher density recording possible.

For example, in the CD-RW system as shown in FIG. 1, in a configuration wherein the wavelength of the light source is in an infrared region (about 780 nm), the numerical aperture of the object lens is about 0.45, a phase change type recording layer is used for the recording layer, further the optical recording layer has a topography corresponding to the topography formed in the disk substrate 5, only the side of the optical recording layer having the topography close to the emitting side of the light for recording or playback, that is, the portions of the optical recording layer corresponding to projecting portions of the topography, is used as recording areas RA, and the side far from the emitting side of the light for recording or playback, that is, the portions of the optical recording layer corresponding to recessed portions of the topography, is not used as the recording areas RA, a recording capacity of about 700 MB is realized in the case of an optical disk having a diameter of 120 mm.

Regarding the above projecting portions and recessed portions, in the process of producing the master, in the surface of a master for forming the disk substrate 5 formed with the grooves the portions corresponding to the areas exposed by the laser beam or electron beam are referred to as "grooves G" and the areas lying between the grooves G are referred to as "lands L". For example, in the case of the general process of production of the optical disk shown in FIG. 1, the projecting portions of the topography correspond to the grooves G, while the recessed portions correspond to the lands L.

Research is underway for further raising the density of optical disks. For example, document A "Optical disk recording using a GaN blue-violet laser diode" (Ichimura et al., *Jpn. J. Appl. Phys.*, vol. 39 (2000), pp 937–942) proposes a technique for realizing a storage capacity exceeding 22 Gigabytes in an optical disk of a DVD size by using a blue-violet semiconductor laser and a 2-group object lens having a numerical aperture 0.85.

When the numerical aperture of the object lens becomes larger, the allowable tilt of the disk in an optical disk device is generally decreased. A comatic aberration $W_{31}$ generated with respect to a tilt angle $\theta$ relative to the optical axis is given by the following Equation (2) according to document B "Aplanatic condition required to reproduce jitter-free signals in optical disk system" (Kubota et al., *Appl. Opt.*, vol. 26 (1987), pp 3961–3973) and is roughly proportional to a cube of the numerical aperture NA and a thickness t of a protection layer (layer formed above the optical recording layer) of the optical disk. Note that, in Equation (2), n is a refractive index of the protection layer.

$$W_{31} = t(n^2-1)n^2 \sin\theta \cos\theta \cdot NA^3/2(n^2-\sin^2\theta)^{5/2} \tag{2}$$

Accordingly, when the value of the permissible comatic aberration $W_{31}$ is $\lambda/4$, in order to secure a allowable disk tilt equivalent to a DVD player in an optical disk device raised up to a numerical aperture of 0.85, it becomes necessary to make the thickness of the protection layer of the optical disk as thin as about 0.1 mm.

FIG. 2 is a schematic view showing a sectional structure of an optical disk formed by the technique reported in the above document A and the method of focusing light thereto.

Grooves 2 are provided in one surface of a disk substrate 1 having a thickness D1 of 1.1 to 1.2 mm. An optical recording layer 3 having a thickness D3 comprised of for example a reflection film, dielectric film, recording film, and dielectric film stacked in that order is formed on this surface. The film configuration and the number of layers are different according to the type and design of the recording material.

A light transmission type protection layer 4 having a thickness D4 of about 0.1 mm is formed above the optical recording layer 3.

In the above system, as shown in FIG. 2, the laser beam LB for playback or recording is condensed by the 2-group lens comprised by for example a first lens (close lens) 12 and a second lens (far lens) 14, passes through the light transmission type protection layer 4, and is focused on the optical recording layer 3 of the optical disk having the above structure.

At the time of playback, the return beam reflected at the optical recording layer is received at the light receiving element, a predetermined signal is generated by the signal processing circuit, and the playback signal is taken out.

In the method of production of the above optical disk, a stamper having grooves in its surface is formed by transfer from a disk master having grooves in its surface, the surface shape is transferred from the stamper to form a disk substrate 1 having grooves 2 in its surface, and an optical recording layer 3 comprised by the stack of for example a reflection film, dielectric film, optical recording layer, and dielectric film is formed by this film formation order. This is a reverse order to the ordinary order. Finally, the light transmission type protection layer 4 is formed above the dielectric film. By this technique, an optical disk having a protection layer of a thickness of 0.1 mm can be formed.

In the above system, in order to improve the planar recording density, a land and groove recording method wherein a depth D2 of the groove structures is made about $\lambda/6n$ ($\lambda$: wavelength of light source of optical disk device, n: refractive index of light transmission type protection layer), the optical recording layer has a topography corresponding to the groove structures, and both areas of the side close to the emitting side of the light for recording or playback in this optical recording layer having topography, that is, the lands L, and the side far from the emitting side of the light for recording or playback, that is, the grooves G, are used as the recording area RA is employed.

In the land and groove recording system, the track pitch TP corresponds to the distance of the center position of a land L to the center position of a groove G and is specifically set to about 0.3 $\mu$m.

Details of the land and groove recording system are described in document C "Land and groove recording for high track density on phase-change optical disks" (Miyagawa et al., *Jpn. J. Appl. Phys.*, vol. 32 (1993), pp 5324–5328) etc.

In this system, in order to make the signal amplitudes of the lands and the grooves equal, the grooves of the disk substrate are formed so that a ratio (duty ratio) of the widths of the lands and the grooves after the formation of the optical recording layer becomes about 1:1. The width of the grooves is determined so that the widths of the recording films corresponding to the lands and the grooves become equal when for example the width of the grooves formed in the disk substrate is made about 60% of the pitch of the grooves and the dielectric film, recording film, other dielectric film, and reflection film are stacked over the entire surface while covering the inside walls of the grooves.

Also, in order to reduce the amount of the light reflected from adjacent tracks, that is, the crosstalk component, using groove interference, the depth of the grooves is made $\lambda/6$ n.

When employing the above land and groove recording system, however, generally, when recording a signal at the side far from the emitting side of the light for recording or playback, that is, in the grooves, the phenomenon (crosswrite) of the signal marks recorded previously in the lands closer in being erased tends to easily occur.

This is due to the fact that the optimum emitted output at the time of recording is not always uniform since the numerical aperture of the object lens is large and the grooves are relatively deep and therefore electromagnetic waves are hard to be propagated in the grooves and the emitted output at the grooves is raised.

Further, this makes it difficult to achieve a uniform quality of the playback signals at the lands and the grooves.

Accordingly, a track density sufficiently making good use of the characteristic feature of the land and groove method, that is, the effect of cancellation of the crosstalk from adjacent tracks, has not been realized.

Also, since both of the lands and the grooves are used as recording areas, it was necessary to devise some means to secure compatibility with a read only (ROM: Read only memory) disks recording information by bits.

DISCLOSURE OF THE INVENTION

The present invention was made in consideration with the above circumstances. Accordingly, an object of the present invention is to provide an optical recording medium (optical disk) which reduces the thickness of the light transmission type protection layer to about 0.1 mm and can handle high density recording by reduction of the wavelength of the light source and an increase of the numerical aperture of the object lens, which optical recording medium realizes prevention of crosswrite and uniformity of playback signal and can easily secure compatibility with a read only disk, and an optical disk device for recording on and/or playing back this.

To achieve the above object, an optical recording medium of the present invention is an optical recording medium on which light condensed by a lens having a numerical aperture of 0.85±0.1 and a wavelength of 405±5 nm is focused for recording or playback, comprising a substrate formed with a groove in its surface, an optical recording layer formed on the substrate at the groove formation surface and having topography corresponding to the groove, and a light transmission type protection layer formed on the optical recording layer, used when light for recording or playback is focused from the protection layer side to the optical recording layer, using as a recording area only the optical recording layer of one of a side far from the emitting side of the light for recording or playback in the optical recording layer having topography, that is, a portion corresponding to a recessed portion of the topography, and a side close to the emitting side of the light for recording or playback, that is, a portion corresponding to a projecting portion of the topography, having a pitch of a projecting portion or recessed portion used as the recording area (track pitch) of 0.32±0.01 $\mu$m. and having a depth of a recessed portion with respect to a projecting portion in the range of 19 to 24 nm.

Since the optical recording medium of the present invention is an optical recording medium on which light condensed by a lens having a numerical aperture of 0.85±0.1 and a wavelength of 405±5 nm is focused for recording or playback which uses as a recording area only the optical recording layer of one of a side far from the emitting side of the light for recording or playback in the optical recording layer having topography, that is, a portion corresponding to a recessed portion of the topography, and a side close to the emitting side of the light for recording or playback, that is, a portion corresponding to a projecting portion of the topography, prevention of the crosswrite between the recessed portions and projecting portions and uniformity of playback signals are realized and, further, it is easy to secure compatibility with a read only disk.

If condensing light having a wavelength of 405±5 nm by a lens having a numerical aperture of 0.85±0.1, in view of the size of the spot of light on the optical recording layer, it is optimal to set the pitch of a projecting portion or recessed portion used as the recording area (track pitch) to 0.32±0.01 µm. To obtain a satisfactory quality of the obtained signal and servo control characteristics, it is necessary to set the depth of a recessed portion with respect to a projecting portion in the range of 19 to 24 nm.

In the optical recording medium of the present invention, preferably a wobble having an amplitude of ±8 to 12 nm is formed in the groove.

If setting the depth of the recessed portion with respect to the projecting portion in the above range, when forming address information as bits, the degree of modulation of the bit signal becomes insufficient, so it is preferable to form a wobble in the groove and incorporate the address information in this. In this case, to satisfy the conditions of the C/N ratio of the wobble signal and the amount of leakage of the wobble from the adjoining tracks, the amplitude of the wobble is set to a range of ±8 to 12 nm.

Further, since only one of the recessed portion and projecting portion is used as the recording area, there are sometimes disadvantages in respect to the recording density, but the recording density can be improved by obtaining the address etc. from a wobble signal etc.

In the above optical recording medium of the present invention, preferably only the optical recording layer of the side close to the emitting side of the light for recording or playback in the optical recording layer having topography, that is, a portion corresponding to a projecting portion of the topography, is used as the recording area.

When comparing the side close to the emitting side of the light for recording or playback, that is, the projecting portion, and the side far from the emitting side of the light for recording or playback, that is, the recessed portion, it is preferable to employ the projecting portion as the recording area based on experimental findings of the crosswrite characteristic.

In the optical recording medium of the present invention, preferably the side close to the emitting side of the light for recording or playback, that is, the portion corresponding to the projecting portion of the topography, corresponds to an area exposed by a laser beam or electron beam at the surface of a master for forming a substrate formed with the groove in a process for producing that master.

In the optical recording medium of the above configuration, in the production method, since the area exposed by the laser beam etc. at the time of production of the master becomes constant, preferably this area is used as the recording area.

Therefore, among the projecting portion and recessed portion, it is preferable that the area exposed at the time of production of the master become the projecting portion. That is, when the portion corresponding to the exposed area is called the "groove", it is preferable to produce it so that the projecting portion becomes the groove.

Also, to achieve the above object, an optical disk device of the present invention comprises a rotation driving means for driving rotation of an optical recording medium comprising a substrate formed with a groove in its surface, an optical recording layer formed on the substrate at the groove formation surface and having a topography corresponding to the groove, and a light transmission type protection layer formed on the optical recording layer; a light source for emitting light for recording or playback having a wavelength of 405±5 nm to the optical recording layer; an optical system including a lens having a numerical aperture of 0.85±0.1 for focusing and emitting the light from the protection film side to the optical recording layer; a light receiving element for receiving a return light reflected at the optical recording layer; and a signal processing circuit for generating a predetermined signal based on the return light received by the light receiving element; uses only the optical recording layer of one of a side far from the emitting side of the light for recording or playback in the optical recording medium, that is, a portion corresponding to a recessed portion of the topography, and a side close to the emitting side of the light for recording or playback, that is, a portion corresponding to a projecting portion of the topography, as the recording area; and uses as the optical recording medium an optical recording medium having a pitch of the projecting portion or recessed portion used as the recording area (track pitch) of 0.32±0.01 µm and having a depth of the recessed portion with respect to the projecting portion of a range of 19 to 24 nm.

The optical disk device of the present invention preferably uses as the optical recording medium an optical recording medium formed in the groove with a wobble of an amplitude of ±8 to 12 nm.

The optical disk device of the present invention preferably uses only the optical recording layer of the side far from the emitting side of the light for recording or playback in the optical recording layer having the topography, that is, the portion corresponding to the projecting portion of the topography, as the recording area.

More preferably, it uses as the optical recording medium an optical recording medium where the side close to the emitting side of the light for recording or playback, that is, the portion corresponding to the projecting portion of the topography, corresponds to an area exposed by a laser beam or electron beam at the surface of a master for forming a substrate formed with the groove in a process for producing that master.

The optical disk device of the present invention can provide an optical disk device using the optical recording medium of the present invention able to realize prevention of crosswrite and uniformity of the playback signals and secure easy compatibility with a read only disk and recording on and playing back the same.

BEST MODE FOR WORKING THE INVENTION

Preferred embodiments of the present invention will be explained next with reference to the attached drawings.

Below, a detailed explanation will be given of an embodiment of the present invention by using the drawings.

The present embodiment was applied to a recording and/or playback apparatus (hereinafter referred to as an "optical disk device") for recording and/or playing back data to or from an optical recording medium, that is, an optical disk.

Figure 3:
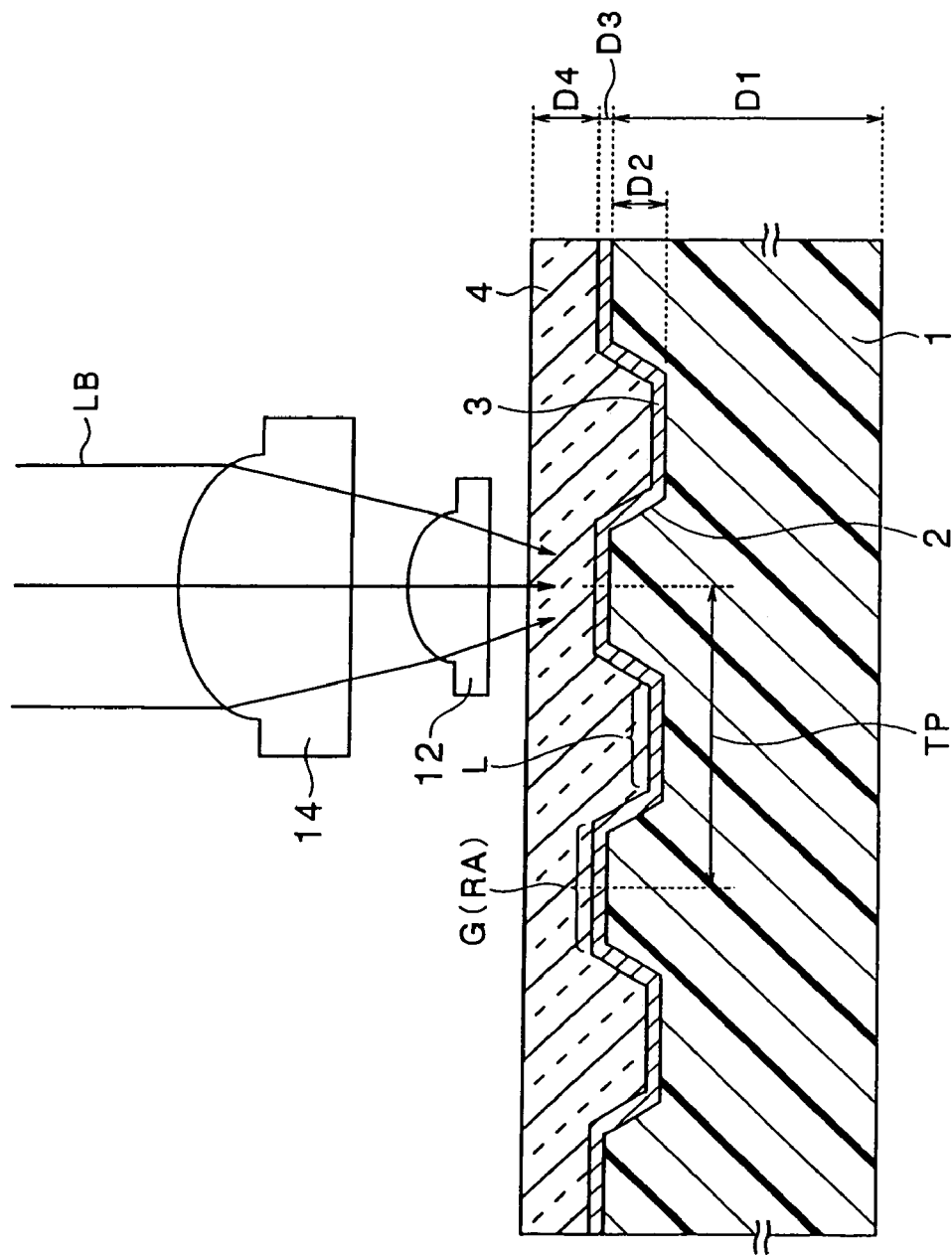
FIG. 3 is a schematic view showing the sectional structure of the optical disk according to an embodiment and the method of focusing light thereto.

FIG. 3 is a schematic view showing the sectional structure of the optical disk according to the present embodiment and the method of focusing light thereto.

Grooves 2 are provided in one surface of a disk substrate 1 having a thickness D1 of 1.1 to 1.2 mm. An optical recording layer 3 having a thickness D3 and comprised of for example a reflection film, dielectric film, recording film, and other dielectric film stacked in that order is formed on the surface. The film configuration and the number of layers are different according to the type and design of the recording material.

A light transmission type protection layer 4 having a thickness D4 of about 0.1 mm is formed above the optical recording layer 3.

In the present embodiment, as shown in FIG. 3, the playback use or recording use laser beam LB is condensed by the 2-group lens comprised by for example the first lens (close lens) 12 and the second lens (far lens) 14, passes through the light transmission type protection layer 4, and is focused on the optical recording layer 3 of the optical disk having the above structure.

The above 2-group lens is used so as to use a lens of a numerical aperture of 0.85±0.1.

Further, the wavelength of the laser beam LB used is 405±5 nm.

At the time of playback, the return light reflected at the optical recording layer is received at the light receiving element, the predetermined signal is generated by the signal processing circuit, and the playback signal is taken out.

In the optical disk, the optical recording layer exhibits a topography corresponding to the grooves 2. One of the side close to the emitting side of the light for recording or playback, that is, projecting portions, and the side far from the emitting side of the light for recording or playback, that is, recessed portions, is used as the recording area RA.

In the optical disk of the present embodiment, since only one of the projecting portions and recessed portions is used as the recording area RA, prevention of the crosswrite between the recessed portions and the projecting portions and uniformity of playback signals are realized and, further, it is easy to secure compatibility with read only disks.

Regarding the above projecting portions and recessed portions, in the process of producing the master, in the surface of a master for forming the disk substrate 1 formed with the grooves the portions corresponding to the areas exposed by the laser beam or electron beam are referred to as "grooves G" and the areas lying between the grooves G are referred to as "lands L".

In the present embodiment, as explained in the method of production explained below, the medium is produced so that side close to the emitting side of the light for recording or playback, that is, the projecting portions, becomes the grooves G and the side far from the emitting side of the light for recording or playback, that is, the recessed portions, becomes the lands L.

In the optical disk of the present embodiment, the track pitch TP corresponds to the pitch of the projecting portions or recessed portions used as the recording areas, that is, the distance between a center position of one projecting portion and the center position of its adjoining projecting portion or the distance of a center position of one recessed portion and the center position of its adjoining recessed portion. If condensing light having a wavelength of 405±5 nm by a lens having a numerical aperture of 0.85±0.1, it is best to set the track pitch to 0.32±0.01 $\mu$m from the spot size of the light on the optical recording layer.

Further, to obtain a satisfactory signal quality, it is necessary to set the depth of the recessed portions with respect to the projecting portions at not more than 24 nm. On the other hand, to obtain satisfactory servo control characteristics, it is necessary to set the depth to at least 19 nm.

The optical disk of the above embodiment is preferably formed with a wobble having an amplitude of ±8 to 12 nm in the groove 2.

If the depth of the recessed portions with respect to the projecting portions is set to the above range, the degree of modulation of the pit signal when forming address information as pits becomes insufficient, but by forming a wobble in the grooves, it is possible to incorporate the address information there. In this case, to make the conditions of the C/N ratio of the wobble signal and the amount of leakage of the wobble from the adjoining tracks satisfactory, the amplitude of the wobble is set to the range of ±8 to 12 nm.

Further, since only one of the recessed portions and projecting portions is used as the recording areas, there are sometimes disadvantages in terms of the recording density, but by obtaining the address etc. from the wobble signal, improvement of the recording density becomes possible. This is preferable from this point.

Figure 1:
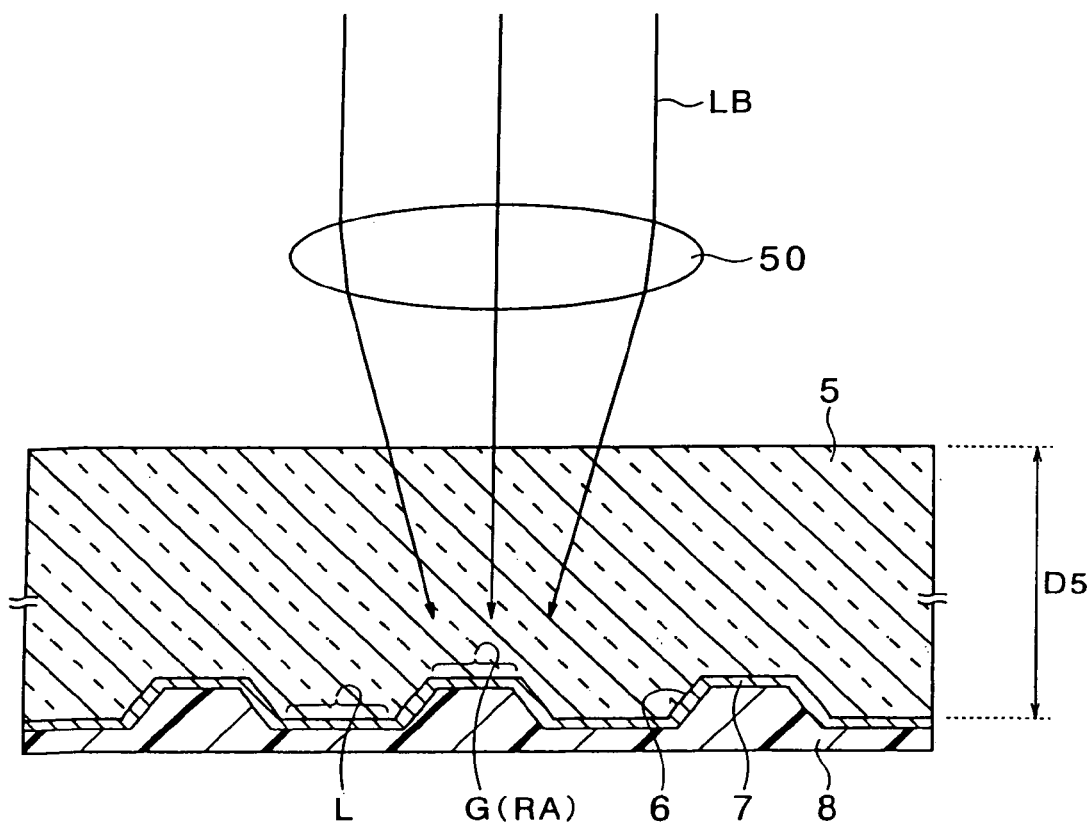
FIG. 1 is a schematic view of the sectional structure of a CD-RW (rewritable) type optical disk and a focusing method of light according to a first conventional example.
Figure 2:
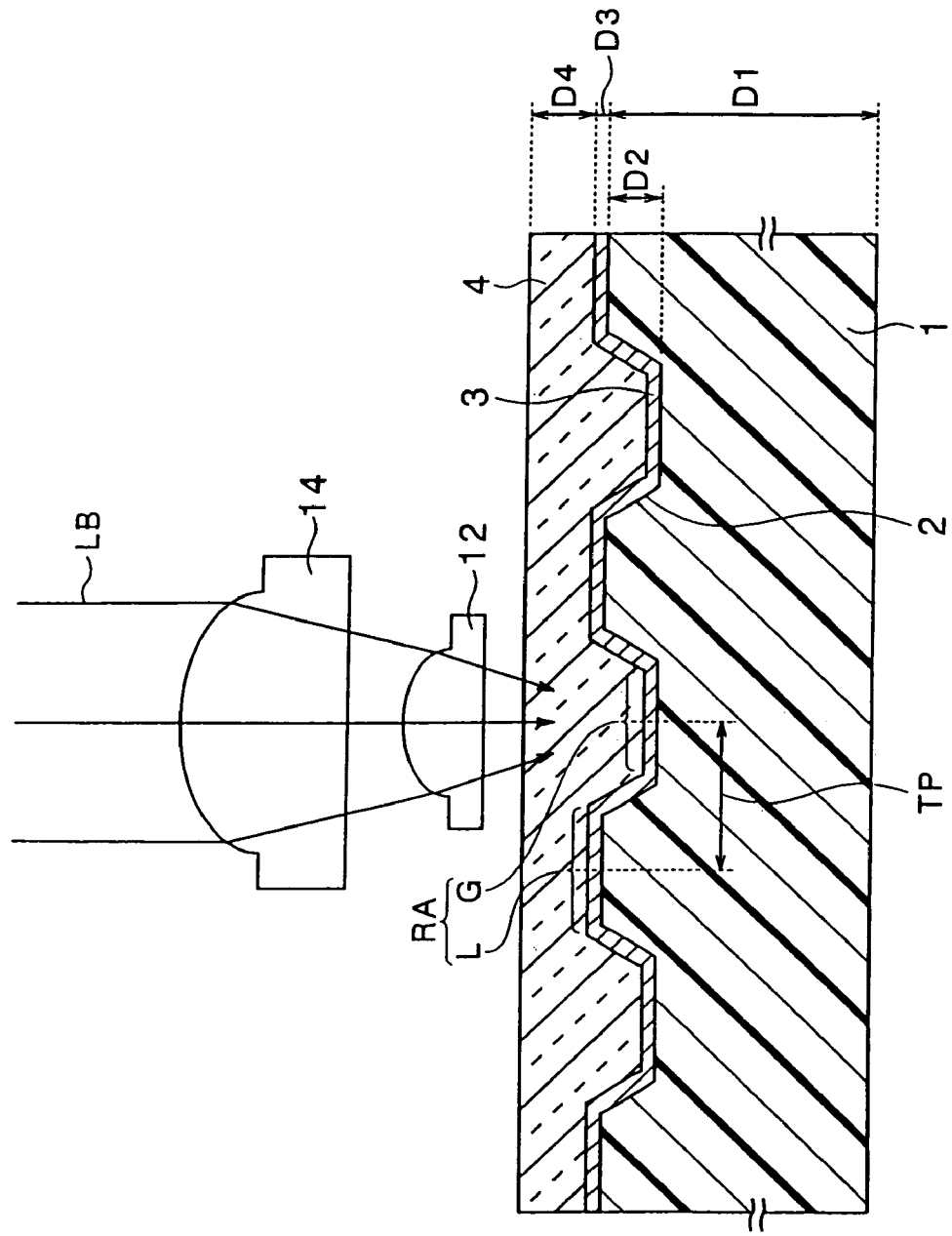
FIG. 2 is a schematic view showing the sectional structure of the optical disk according to a second conventional example and the method of focusing light thereto.

In the optical disk of the above embodiment, when comparing the side close to the emitting side of the light for recording or playback, that is, the projecting portions (grooves G), and the side far from the emitting side of the light for recording or playback, that is, the recessed portions (lands L), from the results of experiments on the crosswrite characteristics, it is preferable to employ the projecting portions (grooves G) as recording areas RA as shown in FIG. 1.

Further, in the method of production of the optical disk of the present embodiment, since the areas exposed by the laser beam etc. at the time of preparation of the disk master become constant in width, it is preferable to use these areas as the recording areas.

From the above reasons, it is preferable to produce the disk so that the projecting portions used as the recording areas correspond to the exposed areas in the process of preparation of the disk master, that is, the projecting portions become the grooves.

If the track pitch is 0.32 $\mu$m, for example, the 1-7RPP modulation scheme is used, and the shortest mark length as determined by the performance of the optical disk device side is made 0.16 $\mu$m, a recording capacity of about 23.3 Gigabytes can be realized by an optical disk of a CD size.

Here, the shortest mark length is made 0.16 $\mu$m assuming that the channel clock T of the optical disk device is 0.08 $\mu$m and a 2 T signal is the shortest mark.

In the future, if the channel clock becomes further shorter, the capacity can be increased more.

Next, an explanation will be made of the method of production of the optical disk of the present embodiment.

Figure 4A:
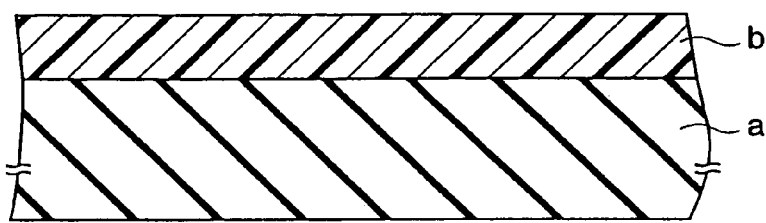
FIG. 4A and FIG. 4B are sectional views of steps of a method of production of an optical disk according to an embodiment.

First, as shown in FIG. 4A, a disk master comprised of a glass substrate a on which a resist film b is formed is prepared.

Figure 4B:
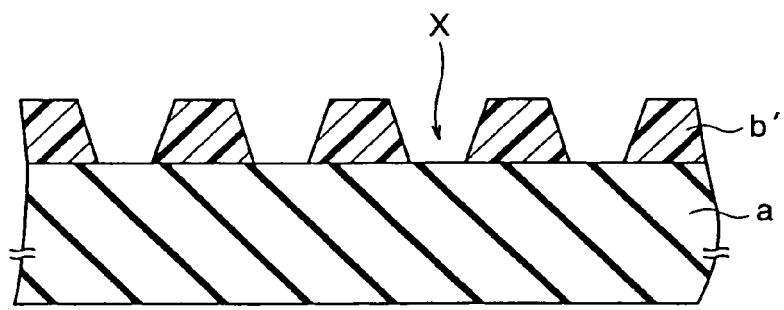

Next, as shown in FIG. 4B, a laser beam or electron beam or the like is used to expose the resist film b by for example a pattern for photosensitizing the areas forming the grooves of the disk substrate and this is developed to thereby form a resist film b' with a pattern opening the areas for forming the grooves of the disk substrate.

Here, the portions of the exposed surface of the glass substrate a in the process of production of the master (portions shown by X in the figure) correspond to the above exposed areas and become grooves in the finally formed optical disk, but in the present embodiment become the side far from the emitting side of the light for recording or playback in the optical disk formed with the grooves, that is, the projecting portions.

Figure 5A:
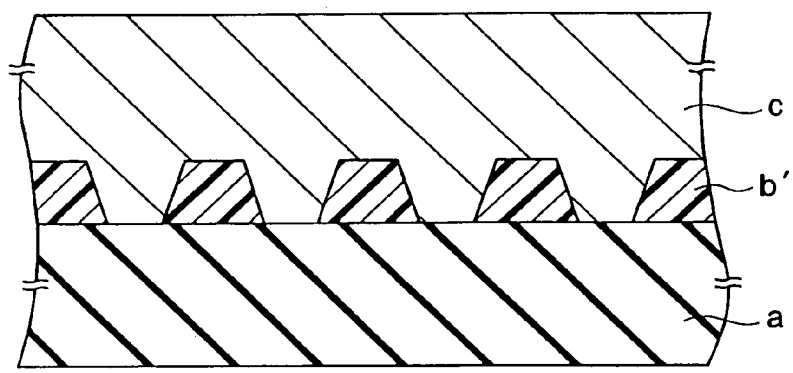
FIG. 5A and FIG. 5B are sectional views of steps of a method of production of an optical disk according to an embodiment.

Next, as shown in FIG. 5A, for example, silver plating or other film formation processing is used to form a metal master c on the disk master comprised of the glass substrate a and resist film b'. The surface of the metal master c has transferred to it a topography having a reverse pattern to the topography of the pattern comprised by the glass substrate a and the resist film b'.

Figure 5B:
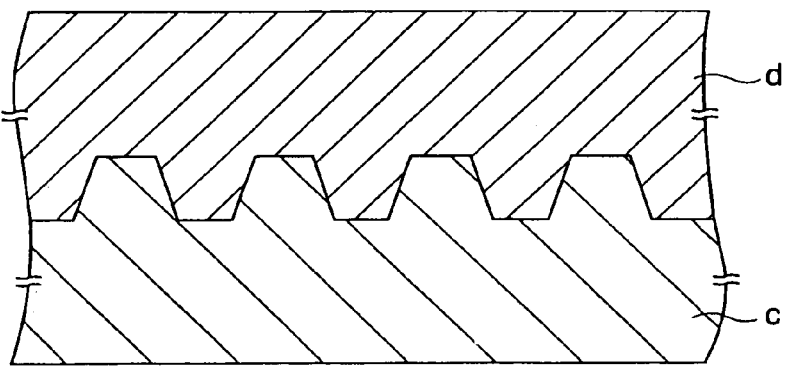

Next, as shown in FIG. 5B, a mother stamper d is formed on the metal master c. The surface of the mother stamper d has transferred to it a topography having a reverse pattern to the topography of the surface of the metal master c. The figure is drawn with the metal master c at the lower side or upside down with respect to FIG. 5A.

Figure 6A:
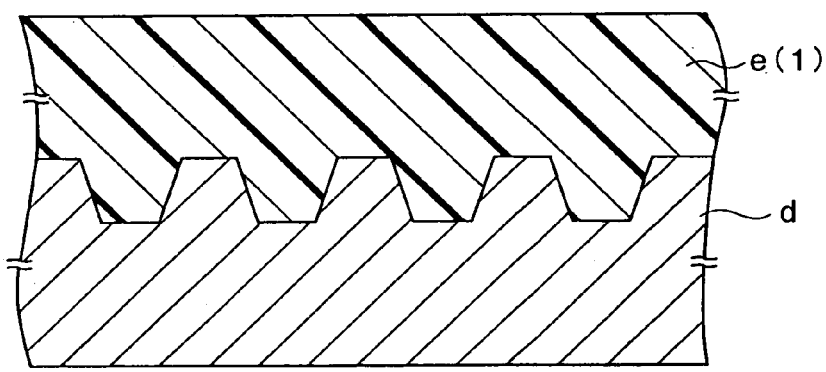
FIG. 6A and FIG. 6B are sectional views of steps of a method of production of an optical disk according to an embodiment.

Next, as shown in FIG. 6A, for example a compression molding method, injection molding method, 2P (Photo Polymerization) method, etc. is used to form a polycarbonate or other plastic substrate, that is, a disk substrate e(1), on the topography pattern of the mother stamper d. The disk substrate e(1) has the grooves f(2) giving a topography of a reverse pattern to the topography of the surface of the mother stamper d. The figure is drawn with the mother stamper d at the lower side or upside down with respect to FIG. 5B.

Figure 6B:
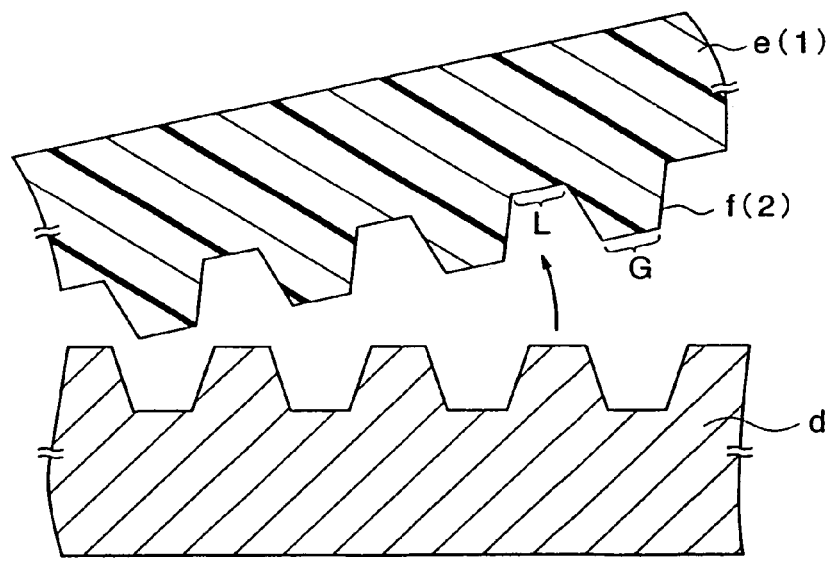

Next, as shown in FIG. 6B, the result is removed from the mother stamper d to obtain the disk substrate e(1).

In the obtained disk substrate e(1), the projecting portions sticking out from the substrate surface correspond to the exposed areas X shown in FIG. 4B, that is, the projecting portions form the grooves G, while the recessed portions between them form the lands L.

Figure 7A:
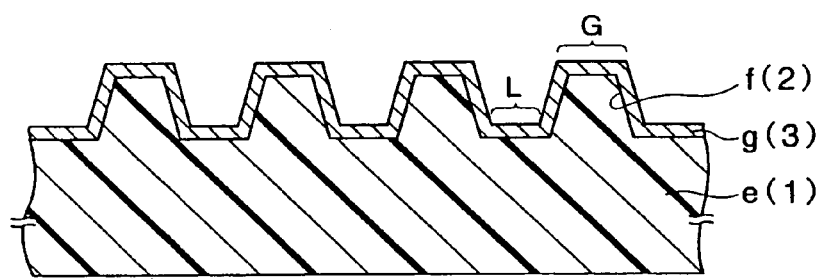
FIG. 7A and FIG. 7B are sectional views of steps of a method of production of an optical disk according to an embodiment.

Next, as shown in FIG. 7A, for example a sputtering method etc. is used to form an optical recording layer g(3) having a stack of for example a reflection film, dielectric film, recording layer, and other dielectric film by that film formation order. This is a reverse order to the ordinary order.

Figure 7B:
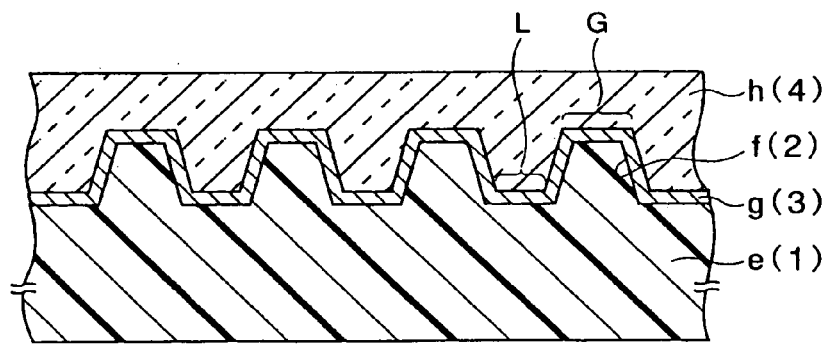

Next, as shown in FIG. 7B, a light transmission type protection layer h(4) is formed above the optical recording layer g(3).

The light transmission type protection layer h(4) can be formed by the method of spin coating or otherwise coating and then curing for example an ultraviolet curing resin or by laminating a polycarbonate or other plastic sheet.

By this technique, an optical disk of the structure shown in FIG. 3 having a protection layer of a thickness of 0.1 mm can be formed.

In the method of production of optical disks used broadly in the past, to topography was inverted from the mother stamper to further form a son stamper and injection molding etc. was used to invert the topography on the surface of the son stamper to form the disk substrate, but in this method, the exposed areas in the process of fabrication of the disk master become the side far from the emitting side of the light for recording or playback, that is, the recessed portions.

On the other hand, in the method of production of optical disks of the present embodiment, the disk substrate is formed directly from the mother stamper and therefore one inversion step is eliminated compared with the above conventional method. Therefore, the exposed areas (areas X in FIG. 4A) in the process of fabrication of the disk master become the side close to the emitting side of the light for recording or playback in the final optical disk, that is, the projecting portions. That is, the side close to the emitting side of the light for recording or playback, that is, the projecting portions, becomes the grooves, while the side far from the emitting side of the light for recording or playback, that is, the recessed portions, become the lands L.

In the method of production of an optical disk of the above embodiment, the width of the exposed areas (areas X in FIG. 4B) in the process of fabrication of the disk master corresponds to the spot size of the laser beam or electron beam, so a constant value can be secured, that is, the width of the grooves becomes constant.

On the other hand, the distance between one groove and another groove, that is, the width of the lands, depends on the accuracy of feed of the laser beam or electron beam in the radial direction of the disk in the mastering system. It is difficult to make it constant.

Namely, this means that the amplitude of the playback signal and the tracking error signal becomes different for every track when using the lands L as the recording areas. This becomes more conspicuous in an optical disk for which a high track density is demanded.

Due to this, it is preferable to use the grooves rather than the lands as the recording areas.

On the other hand, in the present embodiment, it is preferable to use the projecting portions rather than the recessed portions as the recording areas as explained above.

Therefore, it is preferable to produce the disks so that the projecting portions become the grooves. To realize this, in the above method of production, one inversion step is eliminated compared with the conventional method and the exposed areas in the process of fabrication of the disk master are made the projecting portions in the disk substrate.

Figure 8:
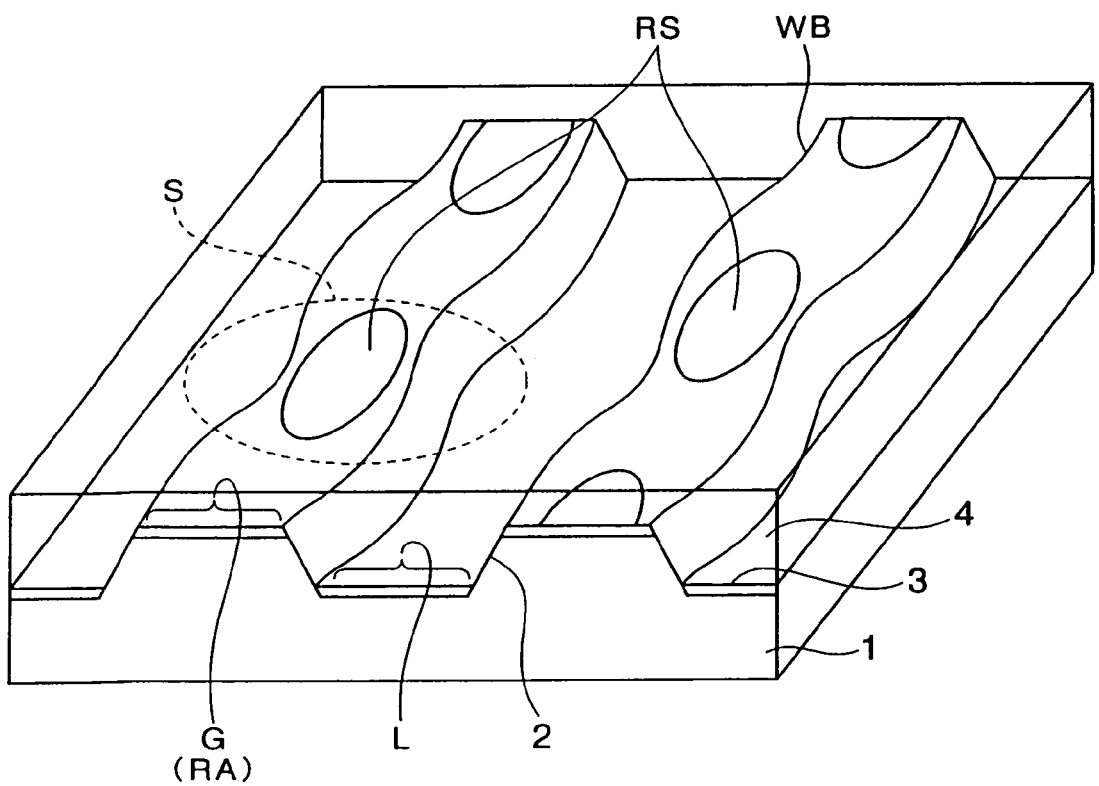
FIG. 8 is a perspective view of a principal part of an embodiment.

FIG. 8 is a perspective view of principal portions of the optical disk of the present embodiment.

The surface of the disk substrate 1 is provided with a groove 2. An optical recording layer 3 is formed on its surface. A light transmission type protection layer 4 is formed above this.

Either of the land L and the groove G, for example, as illustrated, only the groove G, is used as the recording area RA as illustrated, and a recording spot RS is formed.

The portion surrounded by a broken line is the spot S of the laser beam.

As shown in FIG. 8, it is preferable to cause the groove structure to meander in the disk radial direction by a constant cycle to form a wobble WB. A wobble signal is generated by the wobble WB. Based on this signal, the clock signal synchronized with the rotation of the disk, the address signal, etc. are detected.

When forming the wobble WB in the groove structure as described above, the phase of the wobble is determined by the address etc. and the adjoining grooves do not match in phase, so the width of the lands, which corresponds to the distance between one groove and another groove, becomes uneven.

For this reason, to make the amplitude of the playback signal or tracing error signal constant, it is preferable to use the grooves G rather than the lands L as the recording areas RA.

In order to secure compatibility of the tracking error signal with a read only (ROM) disk for reproducing information pits, it is preferable to set the recording area width on the optical disk to not more than 50% and obtain an identical signal polarity.

EXAMPLE 1

The jitter and push-pull signal of a measured track in an optical disk of the above embodiment having a track pitch of 0.32 $\mu$m when using the 1-7RPP scheme as the modulation scheme, making the shortest mark length 0.16 $\mu$m, overwriting the track measured 100 times, then overwriting the adjoining track 100 times were measured. How these measured values changed when changing the depth of the recessed portions with respect to the projecting portions of the disk substrate was investigated.

Figure 9:
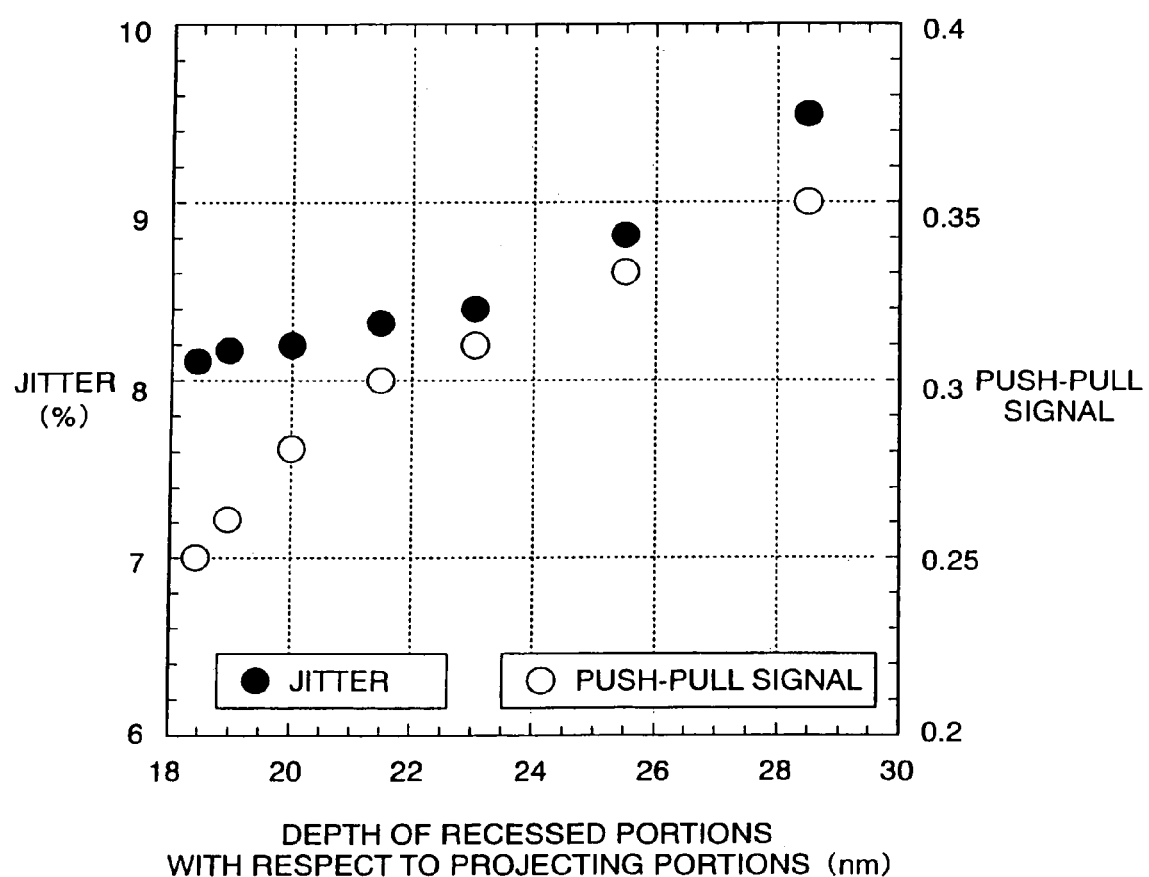
FIG. 9 is a view of results of measurement of jitter and a push-pull signal in Example 1.

FIG. 9 shows the results of the above measurement. In the figure, the black dots show the values of jitter, while the white dots show the values of the push-pull signal.

To maintain stable tracking, the push-pull signal has to be made at least 0.25. To satisfy this, it is necessary that the depth of the recessed portions with respect to the projecting portions of the disk substrate be made at least 19 nm.

On the other hand, for system margin, jitter has to be made not more than 8.5%. To satisfy this, it is necessary that the depth of the recessed portions with respect to the projecting portions of the disk substrate be made not more than 24 nm.

From these results, the depth of the recessed portions with respect to the projecting portions of the disk substrate is made a range of 19 to 24 nm.

EXAMPLE 2

Figure 10:
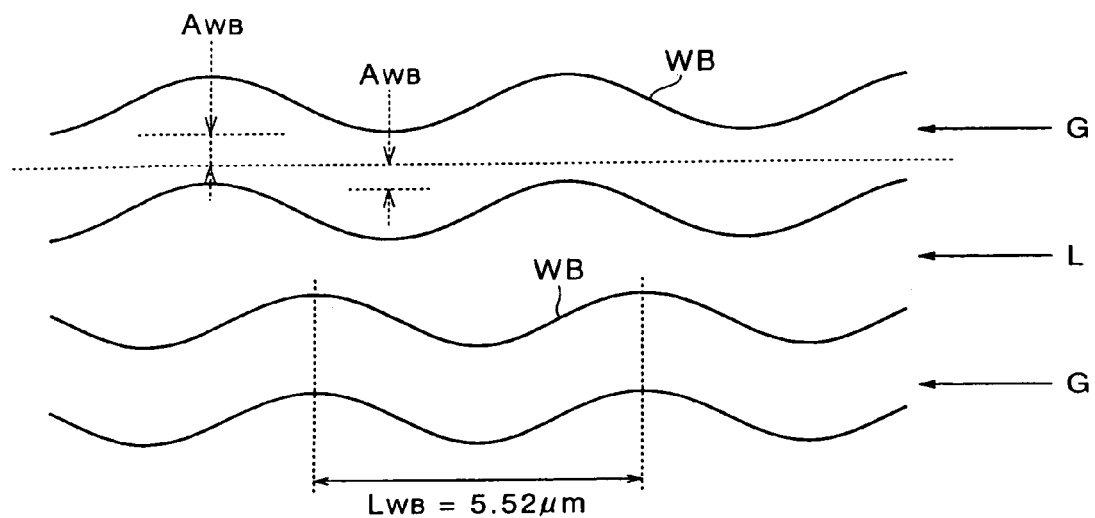
FIG. 10 is a plan view of an example of wobble of Example 3.

FIG. 10 is a plan view of an example of wobble in an optical disk of the above embodiment.

If the depth of the recessed portions with respect to the projecting portions of the disk substrate is set to the range determined in Example 1, the modulation degree of the bit signal when forming the address information as bits becomes less than 20% or insufficient, so a wobble is formed in the grooves to incorporate the address information.

The areas between one groove G and another groove G become the lands L. A wobble WB is formed in the grooves G. This shows that, therefore, the widths of the lands L do not become constant.

When using as units the channel clock T of the optical disk device, setting the length $L_{WB}$ of one cycle of the wobble WB at 69 T, and making T=0.08 $\mu$m, $L_{WB}$ becomes 5.52 $\mu$m.

EXAMPLE 3

The wobble signal is determined by its amplitude. As shown in FIG. 10, the amplitude $A_{WB}$ of the wobble WB is the difference between the center position of the groove in the case of no wobble and the center position of the groove when wobbled the maximum in one direction.

Figure 11:
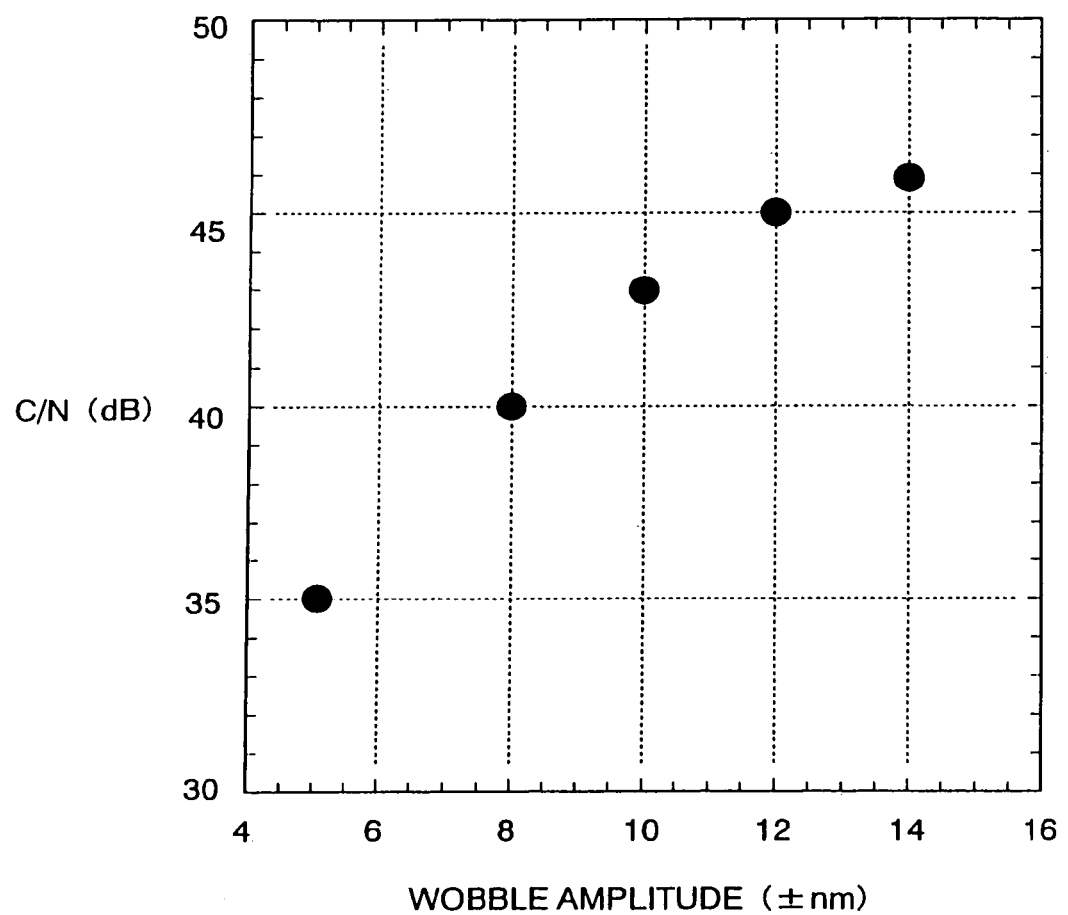
FIG. 11 is a view of a C/N ratio of a wobble signal for changing the wobble amplitude of Example 3.

FIG. 11 shows the C/N ratio of the wobble signal when changing the wobble amplitude. In general, the C/N ratio of a wobble signal has to be at least 40 dB, so the amplitude of the wobble has to be at least ±8 nm.

On the other hand, the upper limit of the wobble amplitude is determined by the amount of leakage of wobble from the adjoining tracks. In experiments, address error occurred when more than ±12 nm.

From the above results, the amplitude $A_{WB}$ of the wobble is set to a range of ±8 to 12 nm.

EXAMPLE 4

The jitter of a measured track in an optical disk of the above embodiment having a track pitch of 0.32 $\mu$m when using the 1-7RPP scheme as the modulation scheme, making the shortest mark length 0.16 $\mu$m, overwriting the track measured 100 times, then overwriting the adjoining track 100 times was measured. In both the case when recording at portions corresponding to the projecting portions of the optical disk and when recording at portions corresponding to the recessed portions of the optical disk how the value of the jitter changed at powers increased by 10% and 20% when making the optimal recording power 0 was investigated.

Figure 12:
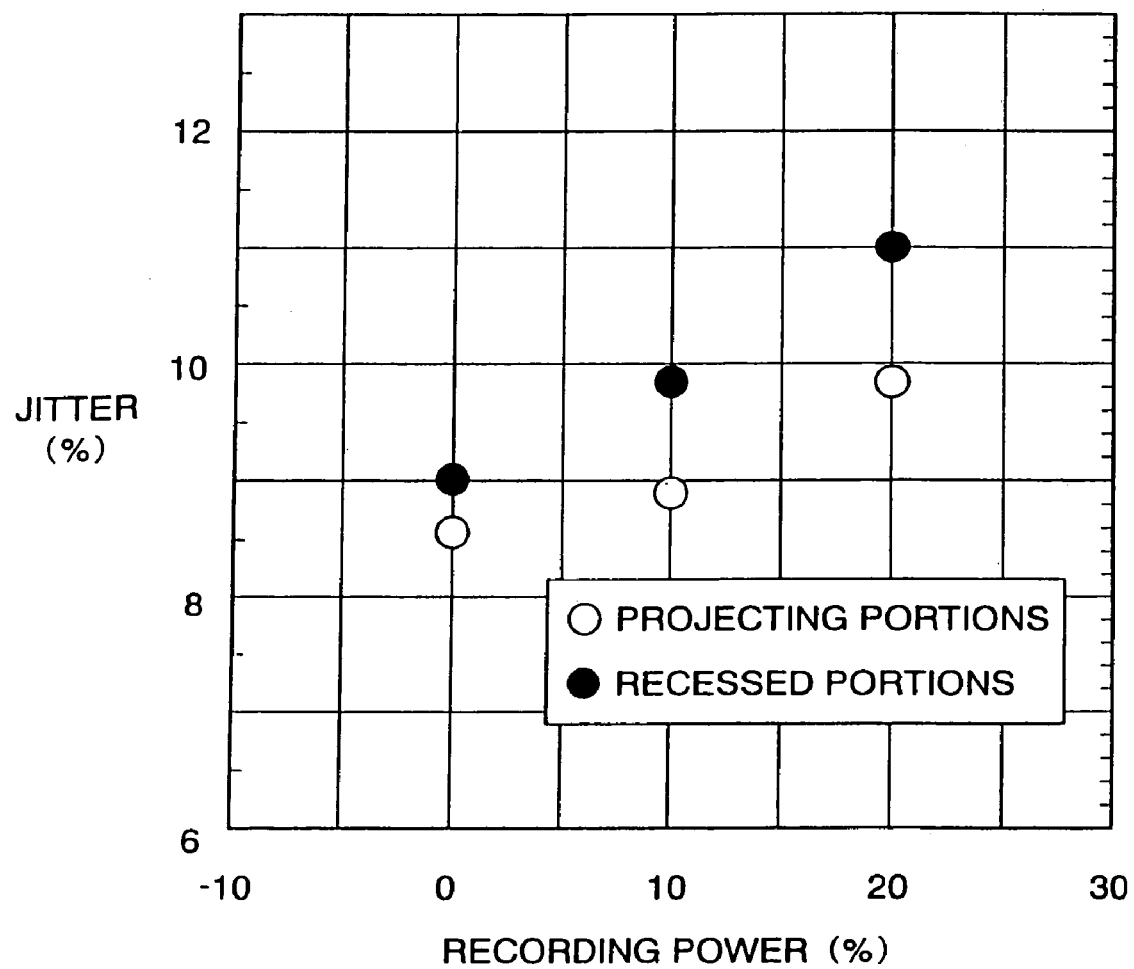
FIG. 12 is a view of results of measurement of jitter of Example 4.

FIG. 12 shows the results of the above measurement. In the figure, the white dots show the values when recording at the projecting portions, while the black dots show the values when recording at the recessed portions.

With both the projecting portions and recessed portions, the jitter tended to deteriorate as the recording power was increased, but this was worse with the recessed portions than the projecting portions. This shows that crosswrite erasing data when writing in adjoining tracks occurs more easily with recessed portions.

From these results, when comparing the projecting portions and recessed portions, it is preferable to use the projecting portions as the recording areas.

Next, an explanation will be given of the optical disk device for recording on and playing back the optical disk of the present embodiment.

Figure 13:
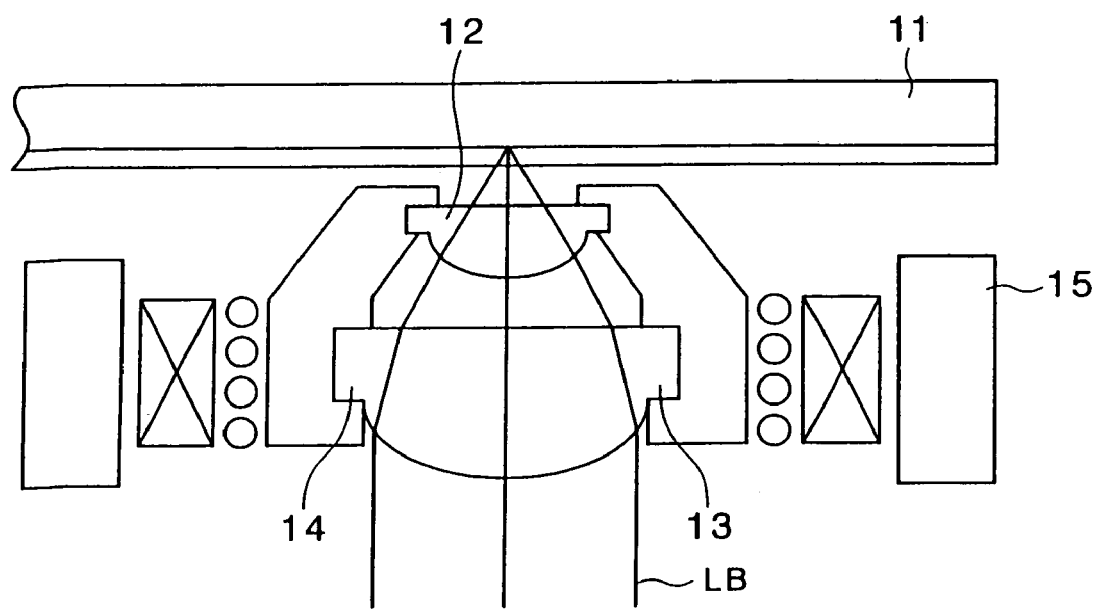
FIG. 13 is a schematic sectional view of the configuration of a 2-group lens for an optical pickup (head) of an optical disk device according to an embodiment.

FIG. 13 is a schematic sectional view of the configuration of a 2-group lens for an optical pickup (head) of the optical disk device according to the present embodiment.

Two lenses having different diameters, that is, a first lens (close lens) 12 and second lens (far lens) 14, are arranged on an identical optical axis and supported by a lens holder 13. This assembly is mounted on an electromagnetic actuator 15 having a structure.

These two lenses function as the 2-group object lens having the numerical aperture of 0.85. The laser beam LB from the light source is focused onto the optical recording layer of an optical disk 11.

Figure 14:
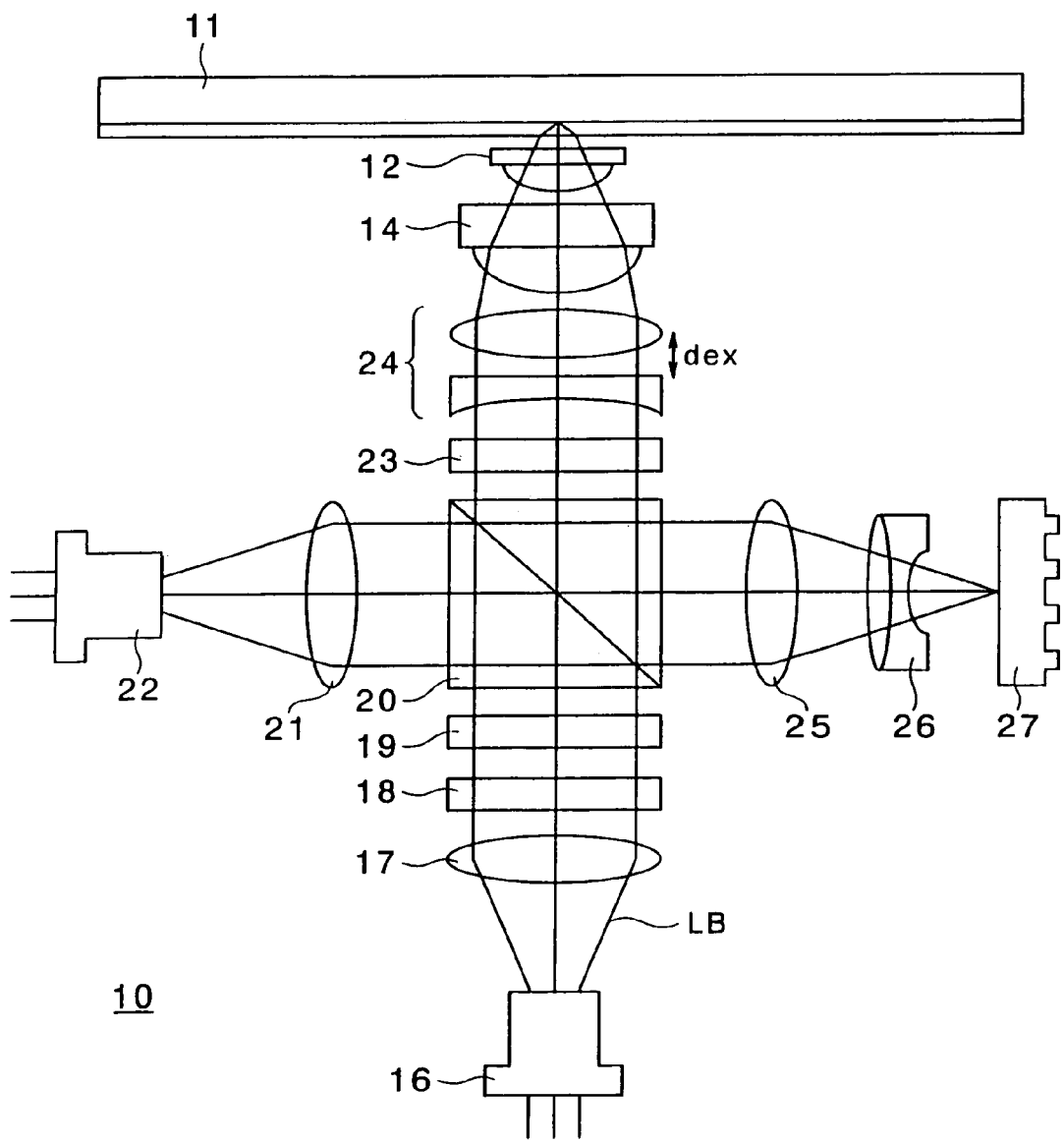
FIG. 14 is a schematic view of the configuration of an optical pickup (head) of the optical disk device according to an embodiment.

FIG. 14 is a schematic view of the configuration of an optical pickup (head) 10 of an optical disk device according to the present embodiment.

A laser beam LB emitted from a semiconductor laser 16 passes through a collimator lens 17, ½ wavelength plate 18, and diffraction lattice 19 and enters a polarization beam splitter 20.

Part of the laser beam LB is reflected at the polarization beam splitter 20 and guided to a light emission output detection use light receiving element 22 by a condenser lens 21.

On the other hand, the laser beam LB passed through the polarization beam splitter 20 passes through a ¼ wavelength plate 23, expander lens unit 24 able to change the distance $d_{ex}$ between the two lenses, far lens 14, and close lens 12 and is focused onto the optical recording layer of the optical disk 11.

Also, the reflected light (returned light) from the optical disk 11 is reflected at the polarization beam splitter 20, guided to a detection light path, passes through the condenser lens 25 and multi-lens 26, enters the light receiving element 27 for detecting the servo error signal and RF signal, and is converted to an electrical signal by photoelectric conversion.

Figure 15:
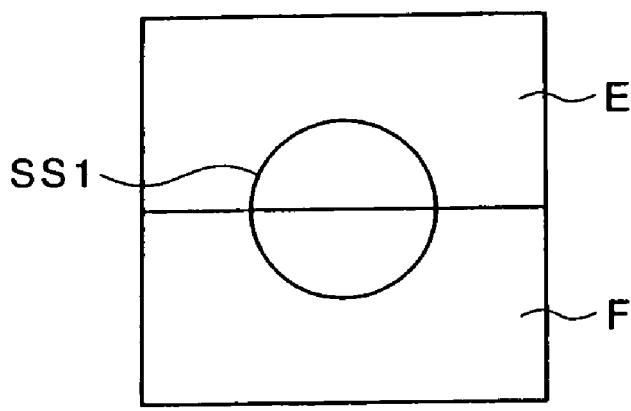
FIG. 15 is a plan view of the configuration of a light receiving element according to an embodiment.
Figure 15:
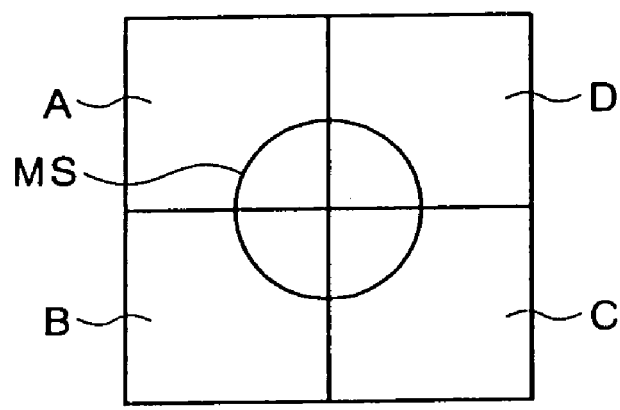
Figure 15:
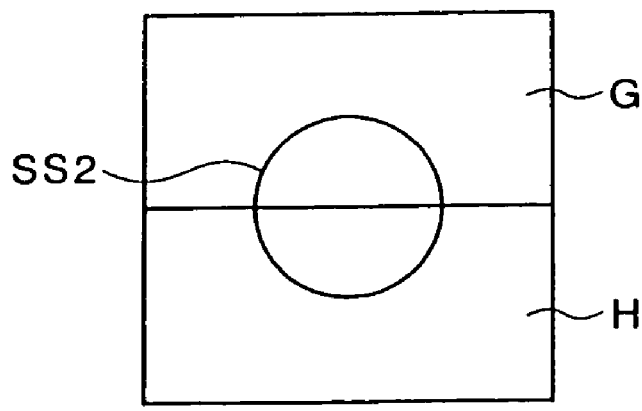

FIG. 15 is a plan view of the configuration of the light receiving element 27 for detecting the servo error signal and the RF signal.

The light receiving element 27 is comprised by eight light detection elements (A, B, C, D, E, F, G, H) as illustrated.

Light entering the light receiving element 27 enters the light detection elements (A, B, C, D) as one main spot MS and upon the light detection elements (E, F) and the light detection elements (G, H) as two side spots (SS1, SS2) generated by the diffraction lattice 19.

A focus error signal, tracking error signal, wobble error signal, and RF signal are computed from output values from the eight light detection elements (A, B, C, D, E, F, G, H).

Figure 16:
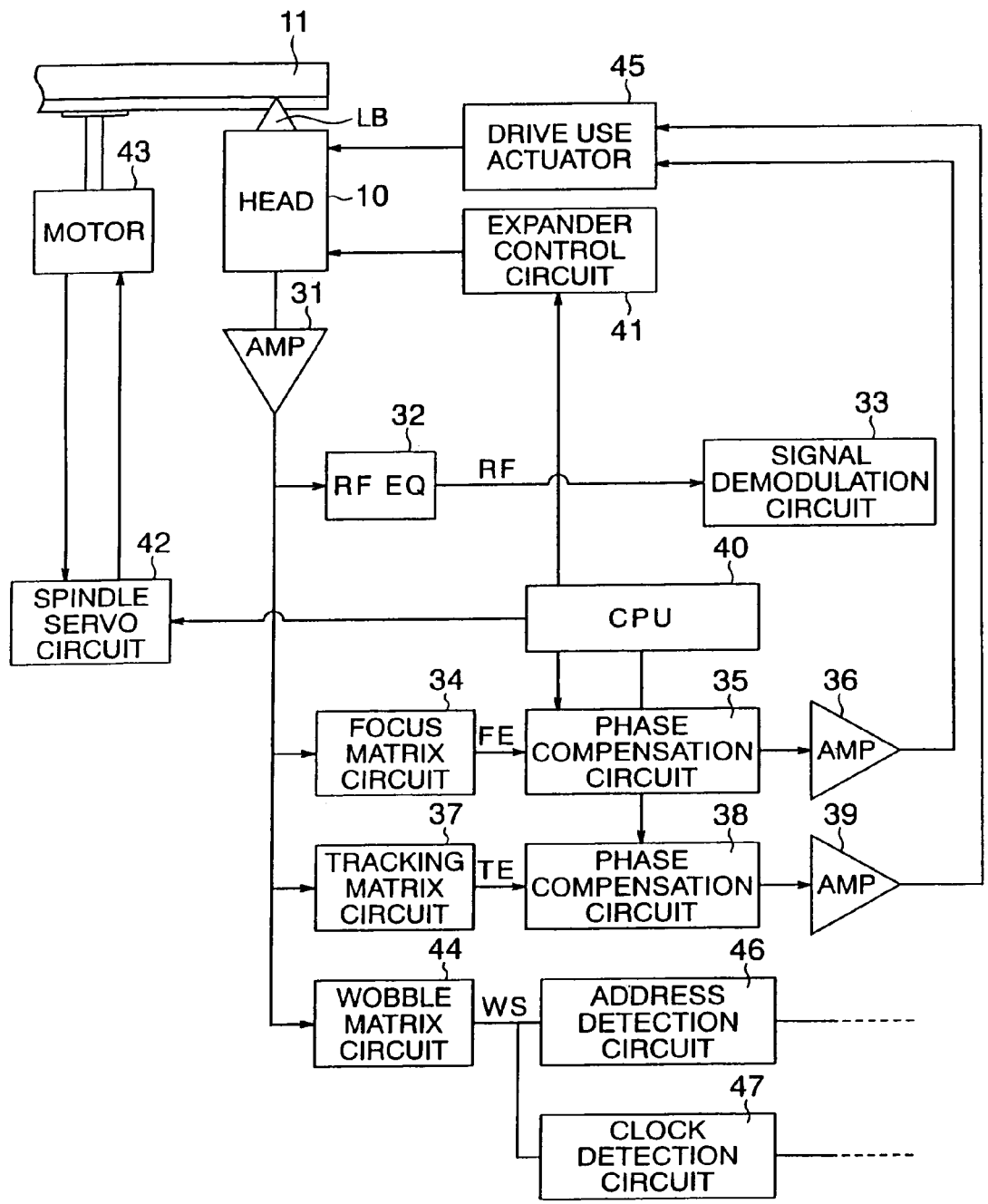
FIG. 16 is a block diagram of the configuration of an optical disk device according to an embodiment.

FIG. 16 is a block diagram of the configuration of the optical disk device according to the present embodiment.

The laser beam LB from the optical pickup (head) 10 is focused onto the optical recording layer of the optical disk 11 driven to rotate by a motor 43. The playback signal obtained by detecting the reflected light (returned light) thereof is input to a head amplifier 31.

The playback signal from the head amplifier 31 is input to an RF equalizer amplifier 32, focus matrix circuit 34, tracking matrix circuit 37, and wobble matrix circuit 44.

The RF signal (RF) computed at the RF equalizer amplifier 32 is input to a signal demodulation circuit 33, where the signal is processed as the playback signal of the information recorded on the optical disk 11.

The focus error signal (FE) and tracking error signal (TE) computed at the focus matrix circuit 34 and tracking matrix circuit 37 are compensated in phase by phase compensation circuits (35, 38), amplified by amplifiers (36, 39), and input to a drive use actuator 45.

The wobble signal WS computed at the wobble matrix circuit 44 is input to an address detection circuit 46, a clock detection circuit 47, etc.

The focus actuator in the drive use actuator 45 moves a position of the head 10 in the optical axis direction based on the focus error signal FE to realize focus servo control. On the other head, it moves the position of the head 10 in the diametrical direction of the optical disk 11 based on the tracking error signal TE to realize tracking servo control.

A CPU (central processing unit) 40 controls the operation of the entire optical disk device such as the correction of spherical aberration by adjustment of the distance $d_{ex}$ between the two lenses of the expander lens unit in the optical pickup (head) 10 through an expander control circuit 41 and control of the drive of rotation through a spindle servo circuit 42 other than the above servo mechanism.

The above optical disk device can provide an optical disk device using the optical recording medium of the present embodiment able to realize prevention of crosswrite and uniformity of the playback signals and secure easy compatibility with a read only disk and recording on and playing back the same.

INDUSTRIAL APPLICABILITY

According to the optical recording medium of the present invention and the optical disk device using this, since only the optical recording layer of one of the side close to the emitting side of the light for recording or playback in the optical recording layer having topography, that is, the lands, and the side far from the emitting side of the light for recording or playback, that is, the grooves, is used as the recording area, the prevention of crosswrite between the lands and the grooves and uniformity of playback signals are realized and, further, it is easy to secure compatibility with a read only disk.

The present invention is not limited to the above embodiments.

DESCRIPTION OF REFERENCES

1 . . . disk substrate
2 . . . groove
4 . . . optical recording layer
5 . . . protection layer
5 . . . disk substrate
6 . . . groove
7 . . . optical recording layer
8 . . . protection layer
10 . . . optical pickup (head)
11 . . . optical disk
12 . . . first lens (close lens)
13 . . . lens holder
14 . . . second lens (far lens)
15 . . . electromagnetic actuator
16 . . . semiconductor laser
17 . . . collimator lens
18 . . . ½ wavelength plate
19 . . . diffraction lattice
20 . . . polarization beam splitter
21 . . . condenser lens
22 . . . light receiving element
23 . . . ¼ wavelength plate
24 . . . expander lens unit 25 . . . condenser lens
26 . . . multi-lens
27 . . . light receiving element
31 . . . head amplifier
32 . . . RF equalizer amplifier
33 . . . signal demodulation circuit
34 . . . focus matrix circuit
35 . . . phase compensation circuit
36 . . . amplifier
37 . . . tracking matrix circuit
38 . . . phase compensation circuit
39 . . . amplifier
40 . . . CPU
41 . . . expander control circuit
42 . . . spindle servo circuit
43 . . . motor
44 . . . wobble matrix circuit
45 . . . drive use actuator
46 . . . address detection circuit
47 . . . clock detection circuit
50 . . . condenser lens
a . . . glass substrate
b, b' . . . resist films
c . . . metal master
d . . . mother stamper
e . . . disk substrate
f . . . groove
g . . . optical recording layer
h . . . protection layer
L . . . land
G . . . groove
RA . . . recording area
RS . . . recording spot
LB . . . laser beam
MS . . . main spot
SS1, SS2 . . . side spots
S . . . spot
WB . . . wobble
TP . . . track pitch For example, the layer configuration of the optical recording layer is not limited to the configuration explained in the embodiments and can be made various structures in accordance with the material etc. of the recording film.

Further, the invention can be applied to a magneto-optic recording medium or an optical disk medium using an organic pigment material in addition to a phase-change type optical recording medium.

The present invention can be modified in various other ways as well in a range not changing the gist of the present invention.

What is claimed is:

1. An optical recording medium on which light condensed by an objective lens having a numerical aperture of 0.85±0.1 and a wavelength of 405±5 nm is focused for recording or playback, said optical recording medium comprising:

a substrate formed with a recessed portion and a projecting portion in a surface thereof, an optical recording layer formed on the substrate at the surface that is formed with the recessed portion and the projecting portion and having a topography corresponding to the recessed portion and the projecting portion, and a light transmission type protection layer having a thickness of 0.1 mm formed on the optical recording layer;

wherein the optical recording medium is configured to be used when light for recording or playback is focused from the protection layer side to the optical recording layer, an underside of the optical recording layer in the recessed portion and a top side of the optical recording layer of the projecting portion is used as a recording area, and the optical recording medium has a distance between a center of one projecting portion and a center of an adjacent projecting portion used as the recording area of 0.32±0.01 $\mu$m; or a distance between the center of one recessed portion and the center of an adjacent recessed portion used as the recording area of 0.32±0.01 $\mu$m and has a depth of the recessed portion with respect to a projecting portion in the range of 19 to 24 nm.

* * * * *